United States Patent
Faryna

(10) Patent No.: US 9,141,782 B2
(45) Date of Patent: *Sep. 22, 2015

(54) AUTHENTICATION USING A WIRELESS MOBILE COMMUNICATION DEVICE

(71) Applicant: BlackBerry Limited, Waterloo (CA)

(72) Inventor: Artur Faryna, Waterloo (CA)

(73) Assignee: BLACKBERRY LIMITED, Waterloo, Ontario (CA)

(*) Notice: Subject to any disclaimer, the term of this patent is extended or adjusted under 35 U.S.C. 154(b) by 51 days.

This patent is subject to a terminal disclaimer.

(21) Appl. No.: 14/056,910

(22) Filed: Oct. 17, 2013

(65) Prior Publication Data
US 2014/0047519 A1   Feb. 13, 2014

Related U.S. Application Data

(63) Continuation of application No. 12/393,905, filed on Feb. 26, 2009, now Pat. No. 8,590,022.

(51) Int. Cl.
*G06F 21/35* (2013.01)
*G06F 21/43* (2013.01)
(Continued)

(52) U.S. Cl.
CPC ............ *G06F 21/35* (2013.01); *G06F 21/43* (2013.01); *H04L 9/3226* (2013.01);
(Continued)

(58) Field of Classification Search
CPC ....... G06F 21/35; G06F 21/43; H04L 63/083; H04L 9/3226; H04L 63/18; H04L 2209/805; H04L 2209/80; H04W 12/06
USPC .............................. 726/5; 455/411
See application file for complete search history.

(56) References Cited

U.S. PATENT DOCUMENTS 8,312,510 B2   11/2012   Morita
8,316,228 B2   11/2012   Winslow
(Continued)

FOREIGN PATENT DOCUMENTS

| EP | 1705595 | 9/2006 |
|----|---------|--------|
| EP | 1744263 | 1/2007 |
| WO | 2004111809 | 12/2004 |

OTHER PUBLICATIONS

Mitigating Man-in-the-middle and Trojan Attacks, www.rsa.com, 2008.
(Continued)

*Primary Examiner* — Kambiz Zand
*Assistant Examiner* — Benjamin Kaplan
(74) *Attorney, Agent, or Firm* — Integral Intellectual Property Inc.; Miriam Paton; Amy Scouten

(57) ABSTRACT

An authentication scheme may be used to decide whether to permit access to a user account access to which is controlled by a network resource server. An initial portion of a password is received at a mobile communication device, and a remaining portion of the password is received at a password client installed in or otherwise coupled to the network resource server. The initial portion is communicated from the mobile communication device to the network resource server, where it is passed to the password client, which combines it and the remaining portion to produce a complete password. A value calculated by the password client from the complete password is sent to a password server, which generated the password and sent the initial portion and remaining portion. If the value matches a value calculated by the password server from the complete password in the same manner, authentication has succeeded.

14 Claims, 13 Drawing Sheets

(51) Int. Cl.
*H04W 12/06* (2009.01)
*H04L 29/06* (2006.01)
*H04L 9/32* (2006.01)

(52) U.S. Cl.
CPC ............. *H04L 63/083* (2013.01); *H04L 63/18* (2013.01); *H04W 12/06* (2013.01); *H04L 2209/80* (2013.01); *H04L 2209/805* (2013.01)

(56) References Cited

U.S. PATENT DOCUMENTS

| | | | |
|---|---|---|---|
| 8,321,917 | B2 | 11/2012 | Kikkawa et al. |
| 2006/0094403 | A1 | 5/2006 | Norefors et al. |
| 2008/0263643 | A1 | 10/2008 | Jaiswal et al. |
| 2009/0222908 | A1 | 9/2009 | Warren |
| 2009/0294539 | A1 | 12/2009 | Kim |
| 2010/0145860 | A1 | 6/2010 | Pelegero |

OTHER PUBLICATIONS

Providing Secure Access to Corporate Resources from BlackBerry Devices, Leveraging Two-factor Authentication, www.RSA.com and www.EMC.com, 2006-2008.

Single sign-on, Wikipedia, Feb. 12, 2009.

Pajatakis, Emmanouil, EP Partial Search Report for EP 09153835.5, Aug. 12, 2009.

Pajatakis, Emmanouil, Extended European Search Report for EP 09153835.5, Oct. 28, 2009.

Pajatakis, Emmanouil, Fourth Exam Report for EP 09153835.5, Jan. 4, 2013.

Pajatakis, Emmanouil, Third Exam Report for EP 09153835.5, Jun. 7, 2011.

Siddiqui, Imran, First Office Action for CA 2,692,416, Jun. 13, 2012.

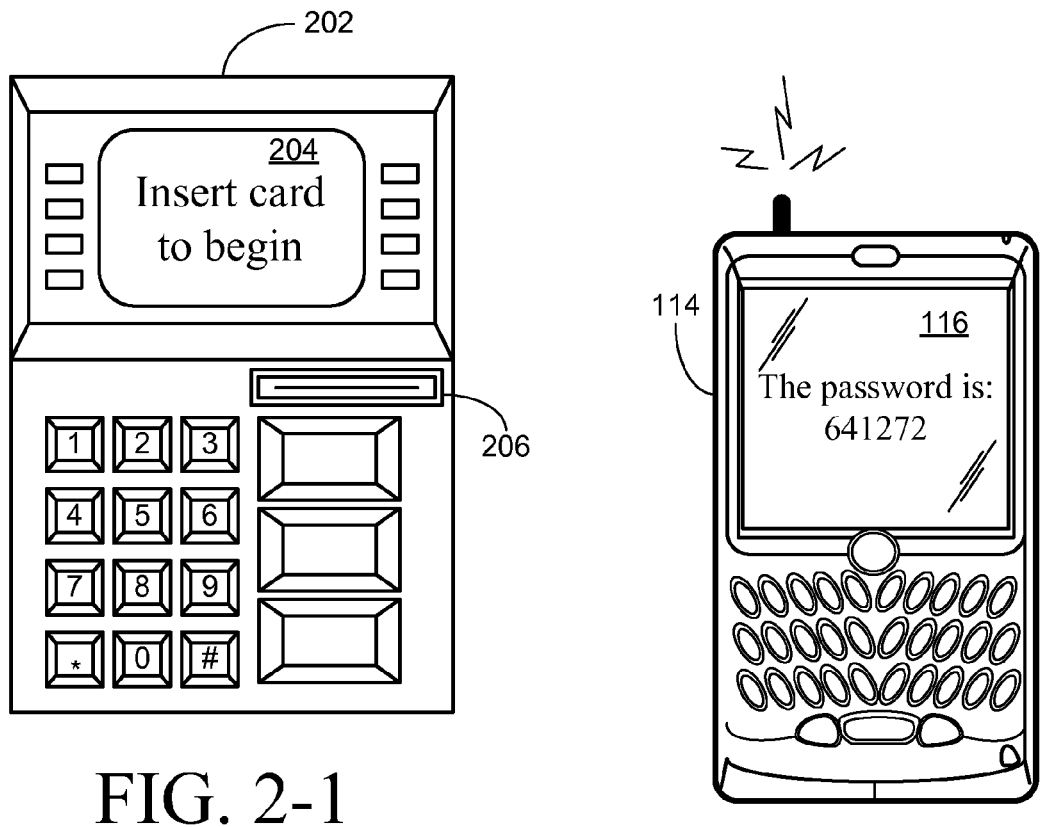
FIG. 2-1
FIG. 2-2
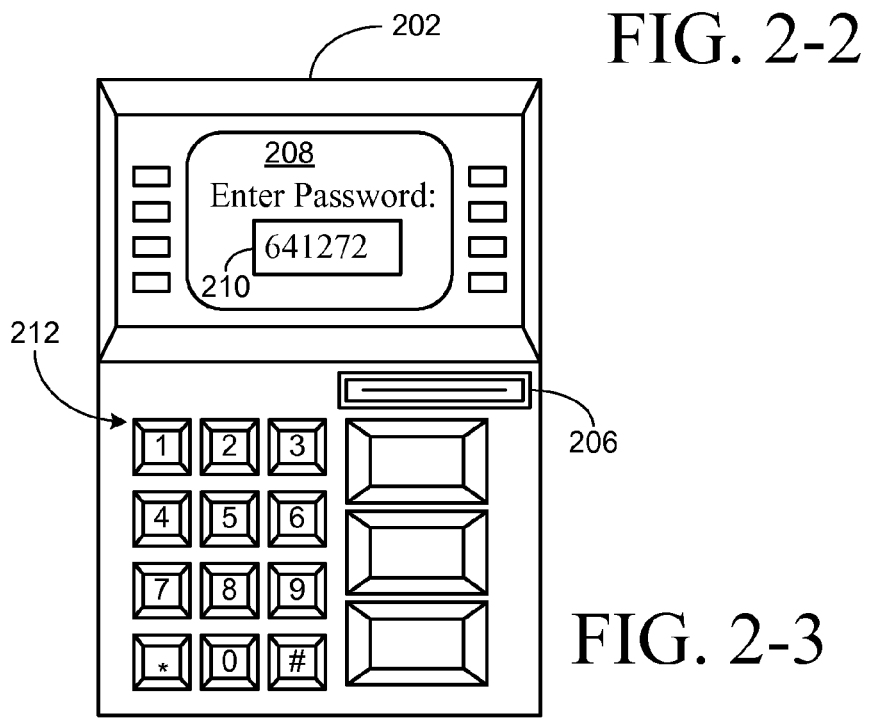
FIG. 2-3

AUTHENTICATION USING A WIRELESS MOBILE COMMUNICATION DEVICE

BACKGROUND

An authentication mechanism may be used to control access to user accounts at Internet websites and other network resources. A common authentication mechanism is one that relies on the provision of a username and password. As the number of user accounts for a person increases, so does the number of username/password combinations that the person needs to remember. For example, the person may use different username/password combinations for an account at a social networking site, an online electronic mail account, an online banking account, an online data and file storage account, and a virtual private network account.

Management of multiple account credentials can be problematic, so people tend to adopt habits that reduce the security of their protected information. For example, the same password may be chosen for multiple accounts, or easy-to-remember passwords that are also easy to guess may be chosen. In another example, people may write down the username/password combinations in an unencrypted file on a computer or on a piece of paper stored near the computer. Even if the username/password combinations are stored securely, the accounts may be vulnerable if the computer used to access the accounts is stolen or otherwise compromised.

BRIEF DESCRIPTION OF THE DRAWINGS

Embodiments are illustrated by way of example and not limitation in the figures of the accompanying drawings, in which like reference numerals indicate corresponding, analogous or similar elements, and in which:

FIGS. 2-1, 2-2 and 2-3 illustrate the use of the authentication scheme described herein from the perspective of a person using an automated teller machine (ATM) to access a user account at a bank server, according to an example embodiment;

FIG. 3 is a block diagram illustration of a system for authentication using a mobile communication device, according to an example embodiment;

FIGS. 4-1, 4-2 and 4-3 together illustrate a method for authentication using a mobile communication device, according to an example embodiment;

FIGS. 7-1 and 7-2 together illustrate a method for registering a user account and mobile communication device to use the authentication scheme as described herein, according to an example embodiment;

Figure 1:
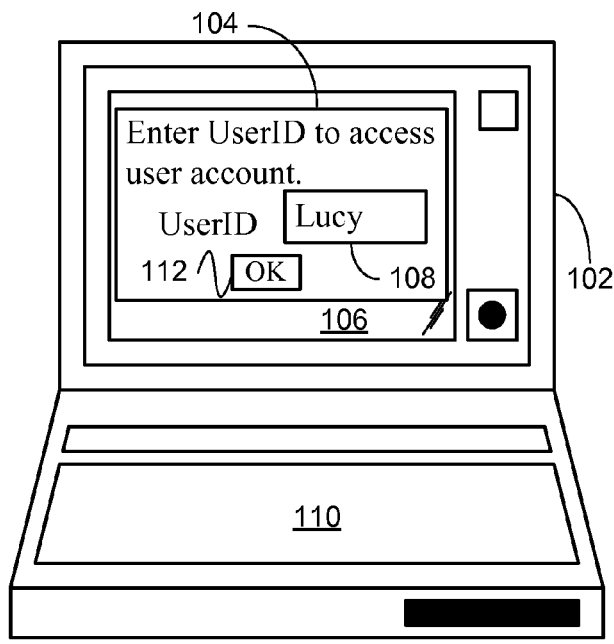
FIGS. 1-1, 1-2 and 1-3 illustrate the use of the authentication scheme described herein from the perspective of a person using a computer to access a user account at a Web server, according to an example embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of example embodiments. However it will be understood by those of ordinary skill in the art that the example embodiments may be practiced without these specific details. In other instances, well-known methods, procedures, components and circuits have not been described in detail so as not to obscure the example embodiments.

Access to a user account at a network resource server requires authentication of the person requesting access. In the authentication scheme described herein, an identifier of the person is provided to the network resource server via a network resource client. The network resource client is coupled to the network resource server via a network. For example, if the network resource server is a Web server and the network resource client is a Web browser running on a computer, the identifier of the person may be a username entered as text in a text field of a Web page displayed in the Web browser. In another example, if the network resource server is a virtual private network (VPN) server and the network resource client is a VPN client application running on a computer, the identifier of the person may be a username entered as text in a graphical user interface of the VPN client application. In yet another example, if the network resource server is a financial authorization server and the network resource client is an automated teller machine (ATM) or debit card electronic authorization device, the identifier of the person may be encoded in the bank card or credit card or debit card and may be retrieved by the network resource client when the card is inserted into a card reader at the network resource client.

It is contemplated that the network resource client may not be separate from the mobile communication device. For example, the network resource client may be a Web browser or VPN client application running on the mobile communication device.

It will be appreciated by persons of ordinary skill in the art that the same network resource server may be accessed via more than one network resource client. For example, different Web browsers running on the same computer may be used to access the same Web server. In another example, Web browsers running on different computers may be used to access the same Web server. In a further example, different ATMs may be used to access the same set of financial authorization servers.

As will be explained in the detailed description below, a single identifier may be used to access multiple user accounts, even when the multiple user accounts are not hosted or accessible by the same network resource servers.

The network resource server requests authentication of the person from a password server. In order to access the password server, a password client is installed in or otherwise coupled to the network resource server. The password client is uniquely identified to the password server by a client identifier, ClientID, and all communications from the password client to the password server include the client identifier. The password client receives the authentication request from the network resource server and consequently makes its own authentication request to the password server.

All communications to and from the password server may pass through an optional network operating center. In some implementations, the password server may be incorporated into the network operating center.

Upon receiving the authentication request from the password client, the password server generates a password. The password server sends an initial portion of the password to the mobile communication device, and sends the remaining portion of the generated password to the password client. The terms "initial" and "remaining" in "initial portion of the password" and "remaining portion of the password", respectively, are merely labels. The portion of the password sent to the mobile communication device is not necessarily the start of the password.

Communications between the password server and the mobile communication device are handled over a network, and the mobile communication device communicates with the network via wireless communications with a base station. The term "base station" as used herein is intended to encompass an access point (AP) of a wireless local area network 'WLAN' (e.g. a Wi-Fi network), a base station of a wireless wide area network 'WWAN' (e.g. a cellular network), and a Head End of a wireless metropolitan area network 'WMAN' (e.g. a WiMAX network).

Upon receipt of the remaining portion of the password from the password server, the password client instructs the network resource server to enable input of the initial portion of the password at the network resource client.

The initial portion of the password may be output to the person in possession of the mobile communication device via any suitable user output component, for example, by displaying the initial portion of the password on a display of the mobile communication device, or by converting the initial portion of the password using a text-to-speech converter and audibly outputting a speech equivalent of the initial portion of the password through a speaker in the mobile communication device. The initial portion of the password may then be provided to the network resource server using a user input component at the network resource client, for example, a microphone or a keyboard or a key pad.

It is contemplated that communication of the initial portion of the password from the mobile communication device to the network resource client and hence to the network resource server will occur via other means. For example, the initial portion of the password may be presented on a display of the mobile communication device encoded in a bar code, and the person in possession of the mobile communication device may be instructed to present the mobile communication device to a bar code reader integrated into or otherwise accessible by the network resource client, so that the bar code reader can read the bar code and therefore the network resource client may obtain the initial portion of the password. In another example, the network resource client may incorporate or have access to a radio frequency identification (RFID) reader, and the mobile communication device may be able to program the initial portion of the password into an RFID tag. The initial portion of the password is provided to the network resource client (and hence to the network resource server) by bringing the RFID tag within communication distance of the RFID reader. In yet another example, the initial portion of the password may be communicated from the mobile communication device to the network resource client via infrared or other short-range wireless communications, such as Bluetooth®. In these last two examples, it is not necessary for the mobile communication device to output the initial portion of the password via a user output component of the mobile communication device.

The network resource server passes on the initial portion of the password to the password client. The password client combines the initial portion of the password and the remaining portion of the password into the complete password. When sending the remaining portion of the password to the password client, or at any other suitable time, the password server may also send combining information to the password client to enable the password client to combine the initial portion of the password and the remaining portion of the password. Alternatively, the way to combine the initial portion of the password and the remaining portion of the password may be hard-wired or hard-coded or preprogrammed into the password client.

The password client calculates a value from the complete password, where the value is a function of the complete password. For example, the password client may apply a hash function to the complete password to calculate the value. The password client then sends the calculated value to the password server. The password server compares the value received from the password client with its own calculated value, calculated from its copy of the complete password in the same manner as the password client. If the two values match, then the authentication has succeeded, and if the two values do not match, then the authentication has failed.

The password server may send value calculation information to the password client to enable the password client to calculate its value from the complete password. For example, the value calculation information may be an indication of which function to use in the calculation. Alternatively, the manner in which the value is calculated may be hard-wired or hard-coded or preprogrammed into the password client.

The password server makes the success or failure of the authentication known to the password client, in any suitable manner known in the art. For example, the password server may send an indication that the authentication has succeeded, or an indication that the authentication has failed. The absence of sending an indication may be sufficient for the password client to determine that the authentication has succeeded or failed. Likewise, the password client makes the success or failure of the authentication known to the network resource server, in any suitable manner known in the art. The network resource server may permit access to the user account if the authentication has succeeded, and may restrict or deny access to the user account if the authentication has failed.

It is contemplated that communications between the password client and the password server will be protected through suitable security measures, for example, authentication or encryption or both. It is also contemplated that communications between the password server and the mobile communication device will be protected through suitable security measures, including, for example, authentication or encryption or both. For example, the mobile communication device may store a public-private key pair, the password server may encrypt the initial portion of the password with the public key of the pair, and the mobile communication device may decrypt the encrypted initial portion of the password with the private key of the pair. In this example, the mobile communication device may send the public key of the pair to the password server during the account registration process, described below, and the password server may store the public key along with an identifier of the mobile communication device for future use.

In the authentication scheme described herein, the password is never sent in its entirety over any communication link. Any attacks on communication links in the system, for example, sniffing or man-in-the-middle attacks, will therefore never obtain the complete password.

Since in the authentication scheme described herein only the initial portion of the password is output to the person via the mobile communication device, an onlooker who views or otherwise eavesdrops on the person will never obtain the complete password. Indeed, the remaining portion of the password is never even made available to the network resource server or to the network resource client, and therefore remains hidden at all times.

It is well known in the art that the strength of a password is a function of its length, complexity and randomness. It is cumbersome for a person to have to type a long password. In the authentication scheme described herein, if the initial portion of the password is to be communicated from the mobile communication device to the network resource client by the person one password element at a time, for example by typing or keying or saying the password characters or digits, then it is advisable that the initial portion of the password be sufficiently short so as not to burden the person. However, the complete password may be as long as desired.

Since in the authentication scheme described herein the network resource server relies on the password server to authenticate the person attempting to access the user account, the network resource server does not store the password, and a new password may be used for each attempted access. In other words, the password may be a single-use password. The password server may even assign a time limit to the password. A timer may be started by the password server when sending the initial portion of the password to the mobile communication device, or when sending the remaining portion of the password to the password client. If the time limit has been exceeded, measuring from the time the timer was started to the time the password server receives the calculated value from the password client, the password server may send a time-out message to the password client or may act as if the authentication has failed.

If access to the mobile communication device is protected by its own password or by any other authentication means (e.g. biometrics or smart card or both), this will add a further layer of security to the authentication scheme described herein. Without knowledge of the mobile communication device's password or without satisfying the other authentication means, the person using the mobile communication device will be unable to receive the initial portion of the password generated by the password server.

Although it is expected that the person attempting to access the user account will have access to both the mobile communication device and the network resource client concurrently, it is conceivable that one person could attempt to access the user account via the network resource client while another person has access to the mobile communication device. In that case, if the person having access to the mobile communication device provides the person attempting to access the user account via the network resource client with the initial portion of the password generated by the password server, and the person attempting to access the user account via the network resource client is able to input the initial portion of the password at the network resource client, then access will be granted.

In short, therefore, a password server performs an authentication method that involves generating a password, determining an initial portion of the password and a remaining portion of the password, and calculating a value that is a function of the password. The password server sends the initial portion of the password to a mobile communication device so that the mobile communication device can output the initial portion of the password. The password server sends the remaining portion of the password to a password client. The password client sends a value back to the password server, and the password server compares the value received from the password client to the value that the password server calculated. If the two values match, the password server can determine that the password client has successfully received the initial portion of the password that was output by the mobile communication device and successfully received the remaining portion of the password that was sent to the password client by the password server, and can therefore determine that authentication has succeeded. If the two values do not match, the password server can determine that the authentication has failed.

From the perspective of the person requesting access to a user account from a network resource server, a method includes providing an identifier of the user account to the network resource server, subsequently receiving a password at a mobile communication device, and providing the password to the network resource server.

From the perspective of the password client, an authentication method for a user account at a network resource server includes receiving from the network server a request for authentication along with an identifier of an association between a mobile communication device and the user account, and subsequently requesting authentication from a password server by sending the identifier of the association to the password server. In response to this request, the password client receives from the password server a remaining portion of a password generated by the password server. In response to receipt of the remaining portion of the password, the password client instructs the network resource server to enable input of an initial portion of the password. The password client subsequently receives input from the network resource server that is supposed to be the initial portion of the password. The password client combines the input with the remaining portion of the password to produce a combination and calculates a value that is a function of the combination. The password client then sends the value to the password server and receives in return an indication whether authentication has succeeded or failed. If authentication has succeeded, the password client instructs the network resource server to permit access to the user account. If authentication has failed, the password client instructs the network resource server to restrict or deny access to the user account.

A user account may be registered to make use of the authentication scheme, where the registration procedure associates the user account with a particular mobile communication device. The registration procedure involves a temporary token, which is created by the password client and shared with the password server and the network resource server. The network resource server outputs the temporary token via a user output component of the network resource client or a user output component of a computer on which the network resource client is running. The person wishing to register the user account is also in possession of a mobile communication device and initiates a registration application at the mobile communication device. The registration application enables the input of the temporary token via a user input component of the mobile communication device. Upon receipt of the temporary token, the mobile communication device sends an association request, an identifier of the mobile communication device, and the temporary token to the password server. The password server, having first checked that the temporary token received from the mobile communication device matches the temporary token received from the password client, associates the identifier of the mobile communication device with an identifier of the password client, labels the association and sends the temporary token and the label back to the password client. The password client passes on the label to the network resource server, which correlates it with an identifier of the user account.

It should be noted that the network resource client used in the registration procedure need not be the network resource client used in the authentication scheme. For example, the user account may be registered using a Web browser running on a first computer, and then access to the user account using the authentication scheme may be attempted using a Web browser running on a second computer. In another example, the user account may be registered using a terminal of the bank server operated by an employee of the bank, and then access to the user account may be attempted at an ATM or debit card electronic authorization device.

Figures 1, 2:
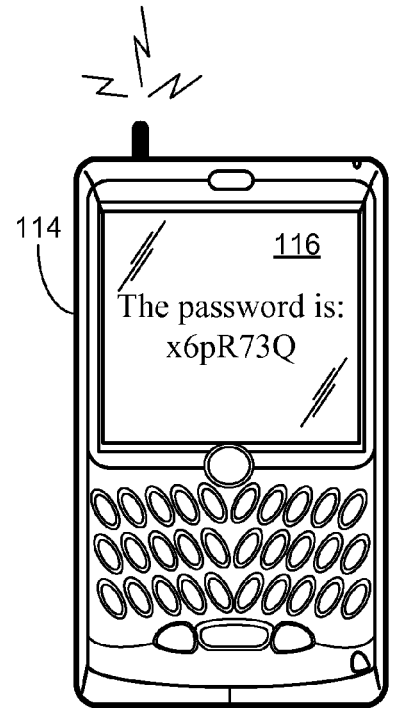
Figures 1, 2, 3:
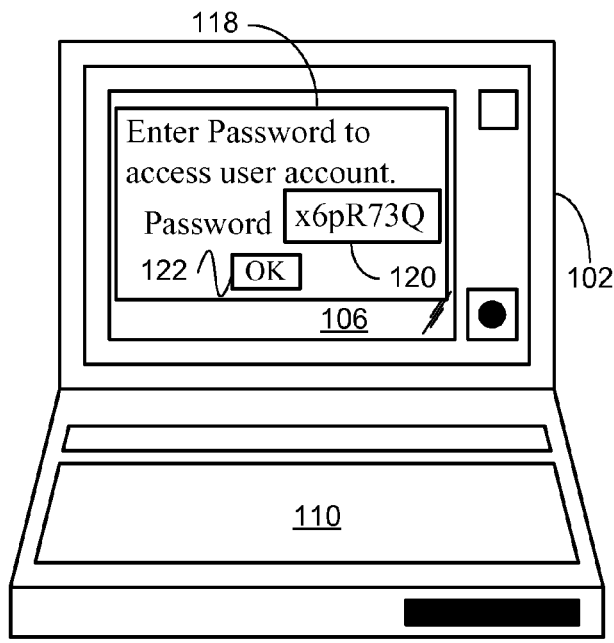
Figure 3:
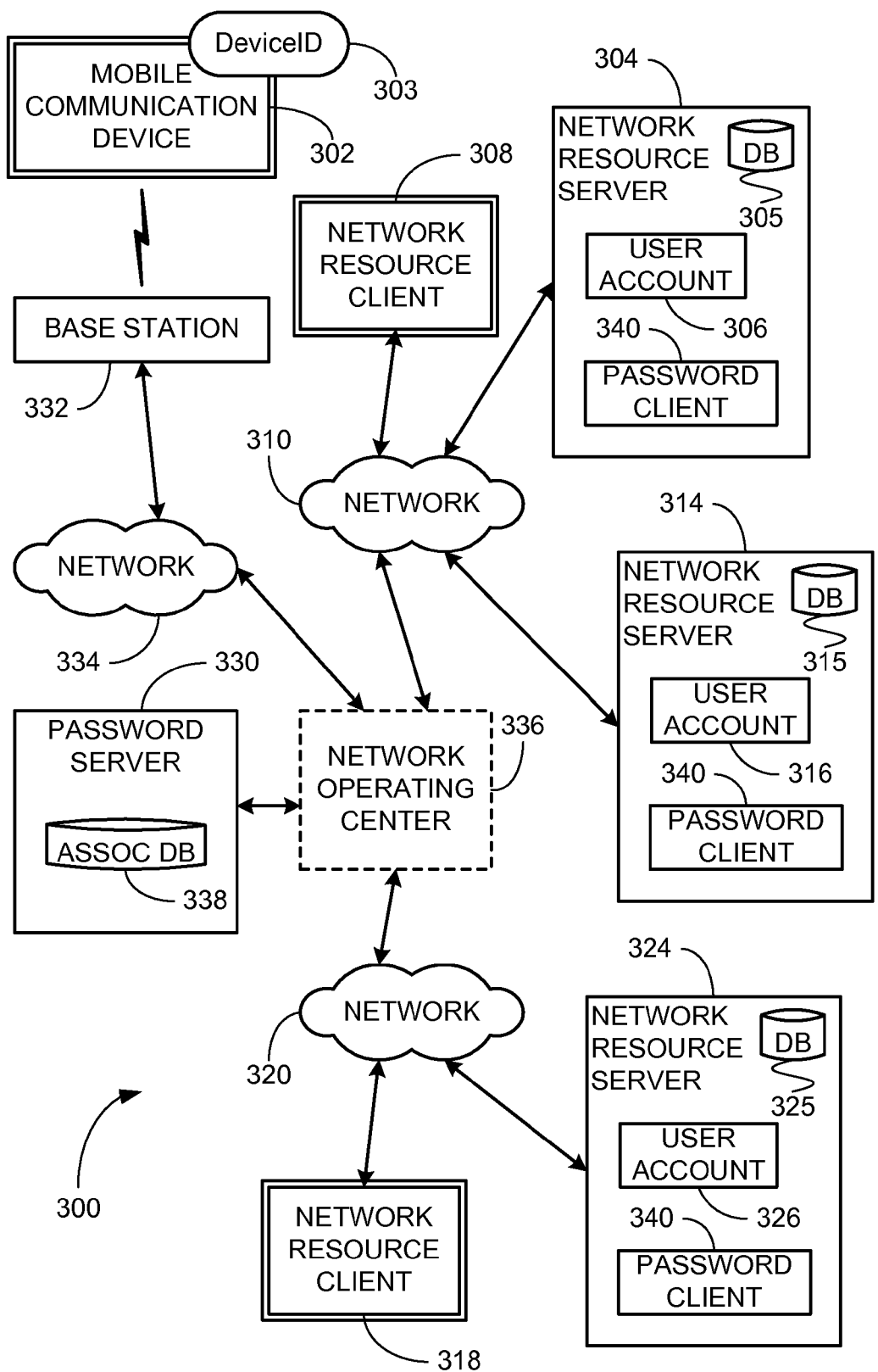
Figures 1, 4:
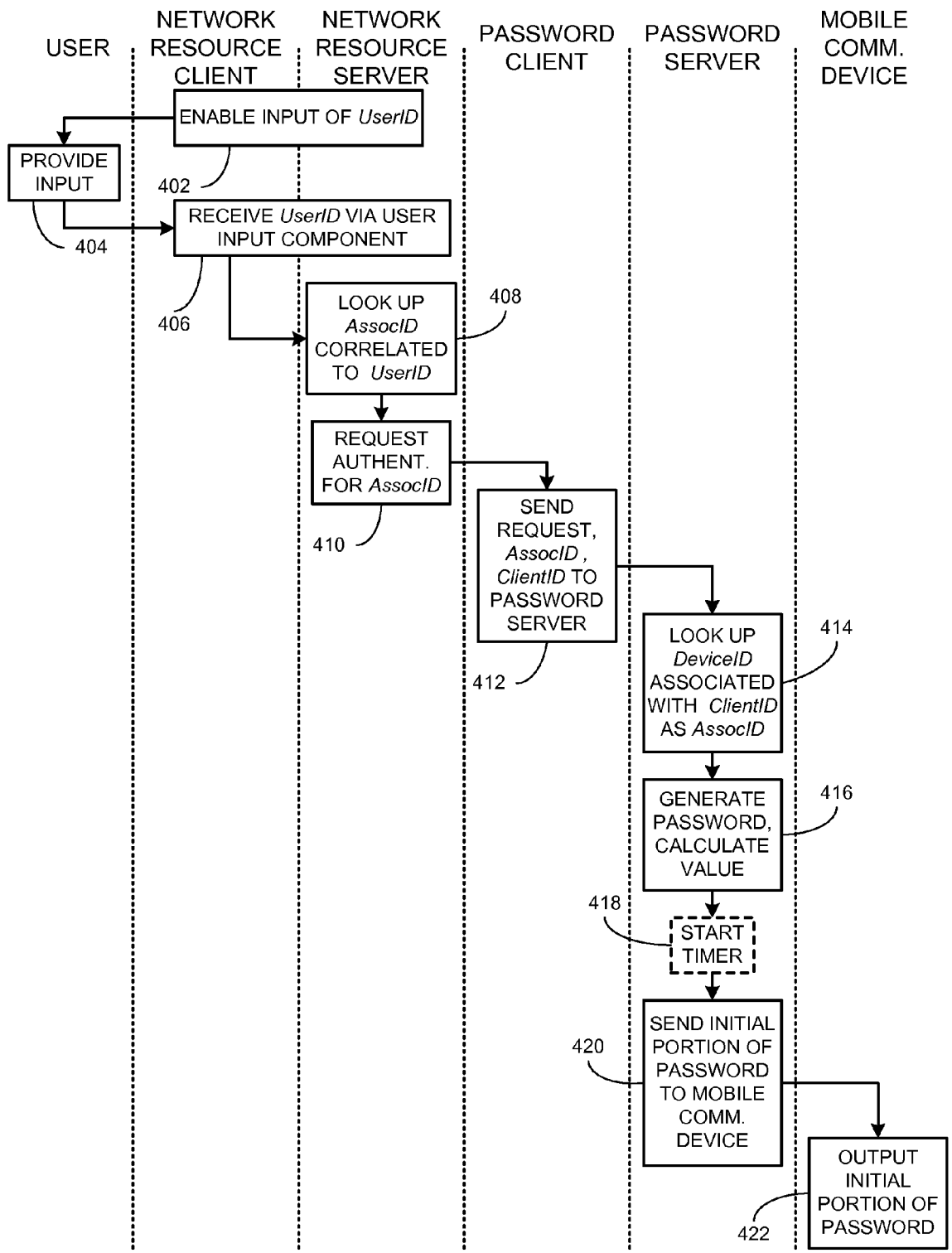
Figures 2, 4:
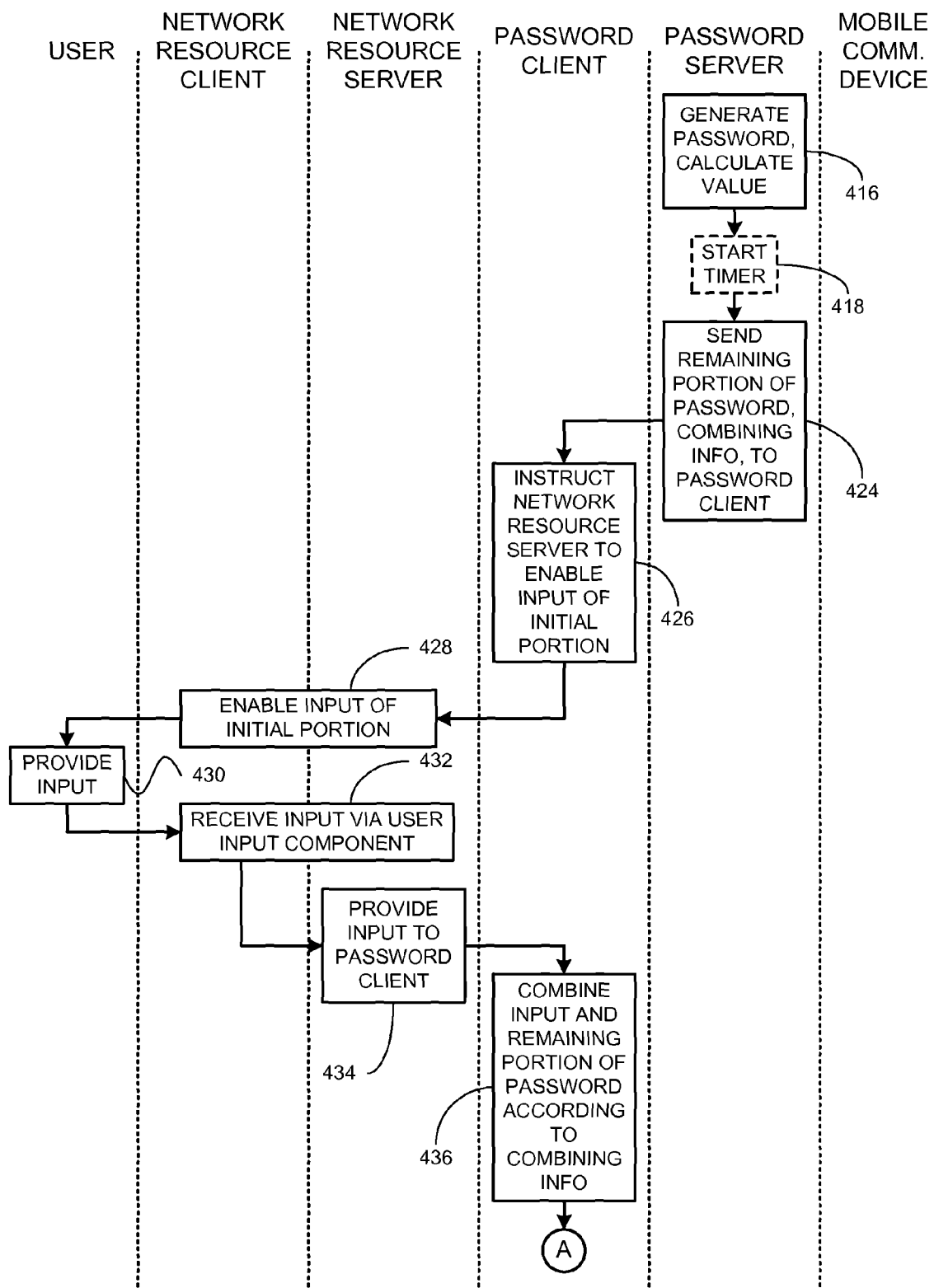
Figures 3, 4:
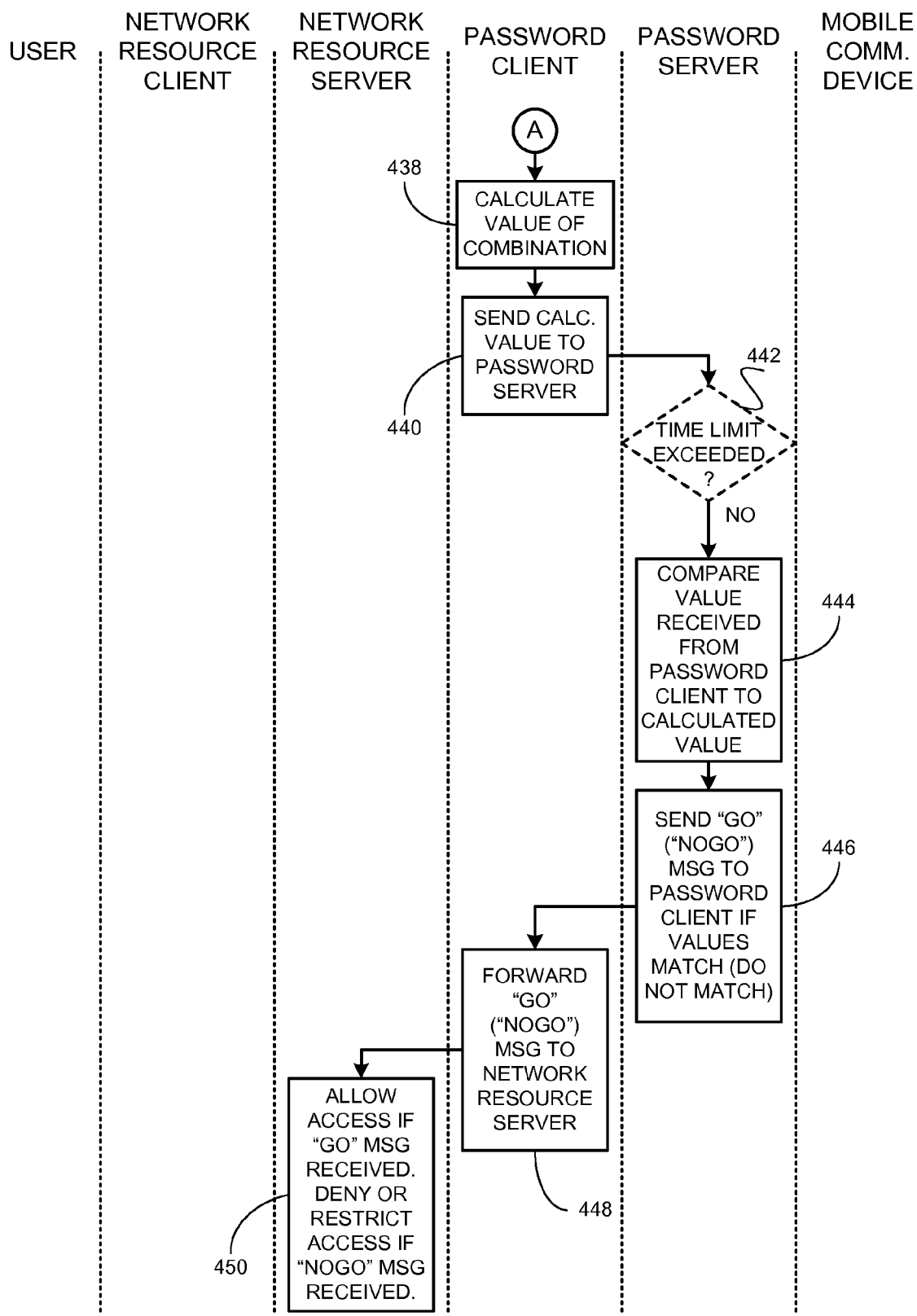

FIGS. 1-1, 1-2 and 1-3 illustrate the use of the authentication scheme described herein from the perspective of a person using a computer to access a user account at a Web server.

FIG. 1-1 is an illustration of an example computer 102 running a Web browser, a screen 104 of which is displayed on a display 106 of computer 102. Screen 104 is a Web page hosted on a Web server. The Web server hosts or has access to a user account that a person at computer 102 is attempting to access. Screen 104 includes a text-entry field 108 that enables the person to enter a user identifier, UserID. In this illustration, the person has entered the value "Lucy" for the UserID, for example, by typing the text "Lucy" on a keyboard 110 of computer 102. Clicking an "OK" button 112 in screen 104 to indicate that entry of the UserID is complete will enable the Web server to receive the text entered in text-entry field 108.

The Web server checks that it hosts or has access to a user account that is linked to the user identifier, UserID. The Web server requests authentication from a password server (not shown). The password server generates a password and sends an initial portion of the password to a mobile communication device. How the password server knows to which mobile communication device to send the initial portion of the password is described in further detail below with respect to FIGS. 7-1 and 7-2.

FIG. 1-2 is an illustration of a mobile communication device 114. After entering the UserID at computer 102, the person receives an initial portion of a password at mobile communication device 114. In this example, the initial portion of the password is "x6pR73Q", and it is displayed on a display 116 of mobile communication device 114.

FIG. 1-3 is another illustration of computer 102. The password server sends a remaining portion of the password to a password client installed in or otherwise coupled to the Web server. The Web server consequently provides the Web browser with a different Web page, displayed as a screen 118 on display 106. Screen 118 includes a text-entry field 120 that enables the person to enter the initial portion of the password, for example, by typing on keyboard 110. Clicking an "OK" button 122 in screen 118 to indicate that entry of the initial portion of the password is complete will enable the Web server to receive the text entered in text-entry field 120.

The Web server passes the text entered in text-entry field 120 to the password client, which combines it with the remaining portion of the password, as received from the password server. The password client then calculates a value from the combination, and sends the value to the password server. The password server calculates its own value from the password, in the same manner as the password client. If the two calculated values match, then access to the user account is granted.

FIGS. 2-1, 2-2 and 2-3 illustrate the use of the authentication scheme described herein from the perspective of a person using an automated teller machine (ATM) to access a user account at a bank server.

FIG. 2-1 is an illustration of an example ATM 202, displaying a screen 204 that instructs a person at ATM 202 to insert a card in a card reader 206. Once the card, for example, a bank card, debit card or credit card, is inserted into card reader 206, card reader 206 can identify the authorized user of the card from information encoded in the card or encoded in a microchip in the card.

The bank server requests authentication from a password server (not shown). The password server generates a password and sends an initial portion of the password to a mobile communication device. How the password server knows to which mobile communication device to send the initial portion of the password is described in further detail below with respect to FIGS. 7-1 and 7-2.

FIG. 2-2 is an illustration of mobile communication device 114. After entering inserting the card in card reader 206, the person receives an initial portion of a password at mobile communication device 114. In this example, the initial portion of the password is "641272", and it is displayed on display 116.

FIG. 2-3 is another illustration of ATM 202. The password server sends a remaining portion of the password to a password client installed in or otherwise coupled to the bank server. The bank server consequently instructs the ATM to display a screen 208. Screen 208 includes a numerical-entry field 210 that enables the person to enter the initial portion of the password, for example, by pressing buttons on a keypad 212 of ATM 202.

The bank server passes the number entered in numerical-entry field 210 to the password client, which combines it with the remaining portion of the password, as received from the password server. The password client then calculates a value from the combination, and sends the value to the password server. The password server calculates its own value from the password, in the same manner as the password client. If the two calculated values match, then access to the user account is granted.

FIG. 3 is a block diagram illustration of an example system, generally referenced 300, for authentication using a mobile communication device.

The mobile communication device can be uniquely identified in the system, and the term DeviceID is used herein to refer to the unique (in the system) value associated with the mobile communication device. Although only a single mobile communication device 302 having an identifier DeviceID 303 is illustrated in FIG. 3, it will be appreciated by persons of ordinary skill in the art that the authentication scheme described herein is applicable to two or more mobile communication devices, each uniquely identified within the system.

A non-exhaustive list of examples of DeviceID follows. For example, an International Mobile Subscriber Identity (IMSI) is a unique number which is stored in a removable Subscriber Identity Module (SIM) card inserted into a GSM-compatible mobile communication device, stored in a Removable User Identity Module (R-UIM) inserted into a CDMA-compatible mobile communication device, and stored in a Universal Subscriber Identity Module (USIM) inserted into a UMTS-compatible communication device. Some CDMA-compatible devices do not include an R-UIM and in such cases, the IMSI is stored directly in the mobile communication device. In another example, BlackBerry® devices from Research In Motion Limited of Waterloo, Ontario, Canada each have a unique Personal Identification Number (PIN) that is used to identify the device. In a further example, every GSM-compatible and UMTS-compatible mobile communication device is uniquely identified by its International Mobile Equipment Identity (IMEI), which is stored in the device itself. It is possible for the mobile communication device to have more than one unique identity, for example, a PIN and an IMSI, or a PIN and an IMSI and an IMEI.

A person may have user accounts at different network resource servers. In the example illustrated in FIG. 3, network resource servers 304, 314, and 324, host or have access to user accounts 306, 316 and 326, respectively.

The person may access a network resource server from a network resource client that is coupled to the network resource server via a network. In the example illustrated in FIG. 3, the person may access network resource server 304 and network resource server 314 from a network resource client 308 via a network 310. For example, network resource client 308 is a Web browser running on a computer (not shown) that is accessible by the person, network 310 comprises the Internet or an intranet, and network resource servers 304 and 314 are Web servers. User account 306 is, for example, an online electronic mail account, and user account 316 is, for example, an account at a social networking site. Also in the example illustrated in FIG. 3, the person may access network resource server 324 from a network resource client 318 via a network 320. For example, network resource server 324 is a financial authorization server, network 320 is a bank network or interbank network or card issuer network, and network resource client 318 is a debit card electronic authorization device, possibly with a separate PINpad to enter the PIN associated with the debit card, or an automated teller machine (ATM). In another example, network resource client 318 is a virtual private network (VPN) client application running on a computer (not shown) that is accessible by the person, network 320 is the Internet, and network resource server 324 is a VPN server.

Although illustrated in FIG. 3 as separate entities, it is contemplated that network resource client 308, 318 may not be separate from mobile communication device 302. For example, network resource client 308 may be a Web browser running on mobile communication device 302. In another example, network resource client 318 may be a VPN client application running on mobile communication device 302.

Access to the user account requires authentication of the person requesting access. A UserID identifying the person is provided to the network resource server via the network resource client. The network resource server requests authentication of the person from a password server 330. In order to access the password server, a password client 340 is installed in or otherwise coupled to the network resource server. The password client is uniquely identified to the password server by a client identifier, ClientID. In FIG. 3, password client 340 is installed in network resource servers 304, 314 and 324, each installation of password client 340 having a unique client identifier, ClientID, to identify the particular instance of password client 340 to password server 330. Although referenced with the same reference numeral, the implementation of password client 340 may differ from one network resource server to another.

Mobile communication device 302 is able to access password server 330 via wireless communications with a base station 332, where base station 332 is coupled via a network 334 to password server 330. All communications to and from password server 330 may pass through an optional network operating center 336. Although not illustrated as such in FIG. 3, password server 330 may be incorporated into network operating center 336 in some implementations.

FIGS. 4-1, 4-2 and 4-3 together illustrate an example method for authentication using a mobile communication device. For clarity of explanation, this example method involves network resource server 304, user account 306, and network resource client 308.

At 402, network resource server 304 enables input of UserID. At 404, the person attempting to access user account 306 provides input, which is received at 406 as UserID via a user input component of network resource client 308. For example, UserID may be entered as text in a text field of a graphical user interface, with the user input component being a touchscreen or a keyboard or a keypad or any other suitable user input component. In another example, UserID may be encoded in a card in the possession of the person and may be read by a card reader incorporated into or otherwise coupled to network resource client 308.

Since there are many different ways to divide the functionality of a network resource server and its network resource client, especially where user output and user input are concerned, such actions are indicated in FIGS. 4-1, 4-2 and 4-3 as being the responsibility of both the network resource server and its network resource client. It will be obvious to persons of ordinary skill in the art how to adjust the method according to the actual division of functionality between the network resource server and its network resource client.

At 408, network resource server 304 looks up an association identifier, AssocID, that is correlated at the network resource server with UserID. The establishment of the correlation of UserID and AssocID is explained in further detail below with respect to FIGS. 7-1 and 7-2.

At 410, network resource server 304 supplies AssocID to password client 340 and requests authentication from password client 340. At 412, password client 340 sends an authentication request, its ClientID, and AssocID to password server 330.

At 414, password server 330 receives the authentication request and AssocID, and looks up the DeviceID of the mobile communication device that is associated at password server 330 with ClientID in an association labeled as AssocID. The establishment of the association of AssocID, ClientID and DeviceID is explained in further detail below with respect to FIGS. 7-1 and 7-2.

At 416, password server 330 generates a password to be used in the authentication scheme. Also at 416, or at any time after generating the password and prior to performing the comparison at 442 described below, password server 330 calculates a value from the password, where the value is a function of the password. For example, password server 330 may apply a hash function to the password to calculate the value.

At 418, password server 330 may optionally start a timer. At 420, password server 330 sends an initial portion of the password to mobile communication device 302. At 422, mobile communication device 302 may output the initial portion of the password, received from password server 330. Mobile communication device 302 may output the initial portion of the password via a user output component of mobile communication device 302. However, as explained above, in some implementations, communication of the initial portion of the password from mobile communication device 302 to network resource client 308 does not require that mobile communication device output the initial portion of the password via a user output component of mobile communication device 302.

After generating the password at 416, and after optionally starting the timer at 418, password server 330 at 424 sends the remaining portion of the password to password client 340. When sending the remaining portion of the password to password client 340, or at any other suitable time, password server 330 may also send combining information to password client 340 to enable password client 340 to combine the initial portion of the password and the remaining portion of the password. Alternatively, the way to combine the initial portion of the password and the remaining portion of the password may be hard-wired or hard-coded or preprogrammed into password client 340.

An example method for generating a password and for determining an initial portion of the password and a remaining portion of the password is described below with respect to FIG. 5. However, any method that generates a strong password and yields an initial portion that is not cumbersome for the person to transfer from the mobile communication device to the network resource client can be used.

At 426, after having received the remaining portion of the password from password server 330, password client 340 instructs network resource server 304 to enable input of the initial portion of the password.

At 428, network resource server 304 enables input of the initial portion of the password. At 430, the person attempting to access user account 306 provides input, which is received at 432 as input, possibly via a user input component of network resource client 308. Various example techniques for communicating the initial portion of the password from mobile communication device 302 to network resource client 308 are described above, and these techniques encompass actions 428, 430 and 432.

At 434, network resource server 304 provides input to password client 340. At 436, password client 340 combines input and the remaining portion of the password, possibly according to combining information received by password client 340 from password server 330.

At 438, password client 340 calculates a value from the combination of input and the remaining portion of the password, using the same technique as password server 330 applied to the password. For example, password client 340 may apply the same hash function to the combination as password server 330 applied to the password. When sending the remaining portion of the password to password client 340, or at any other suitable time, password server 330 may also send value calculation information to password client 340 to enable password client 340 to calculate the value.

At 440, password client 340 sends the calculated value to password server 330.

Upon receipt of the calculated value from password client 340, password server 330 may optionally check at 442 whether a time limit has been exceeded. If so, although not explicitly shown in FIG. 4-3, password server 330 may send a time-out message to password client 340 or may act as if the authentication has failed.

At 444, password server 330 compares the value received from password client 340 with its own calculated value. If the two values match, then the authentication has succeeded, and if the two values do not match, then the authentication has failed.

At 446, password server 330 makes the success or failure of the authentication known to password client 340, in any suitable manner known in the art. For example, password server 330 may send a "GO" message to password client 340 if the two values match, and may send a "NOGO" message to password client 340 if the two values do not match.

At 448, password client 340 makes the success or failure of the authentication known to network resource server 304, in any suitable manner known in the art. For example, password client 340 may forward the "GO" or "NOGO" message received from password server 330 to network resource server 304.

At 450, network resource server 304 permits access to user account 306 if the authentication has succeeded, and denies or restricts access to user account 306 if the authentication has failed.

Figure 5:
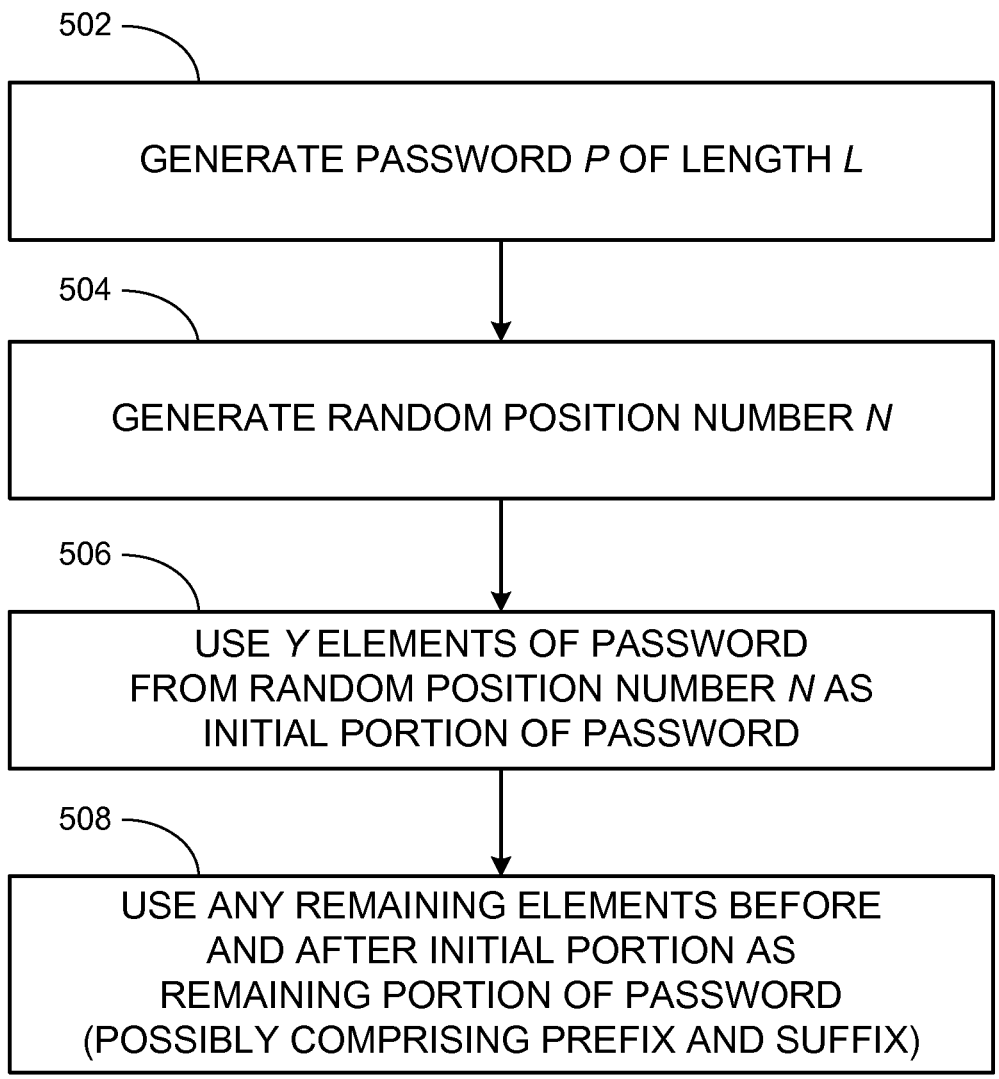
FIG. 5 illustrates a method for generating a password, and for determining an initial portion of the password and a remaining portion of the password, according to an example embodiment.
Figure 6:
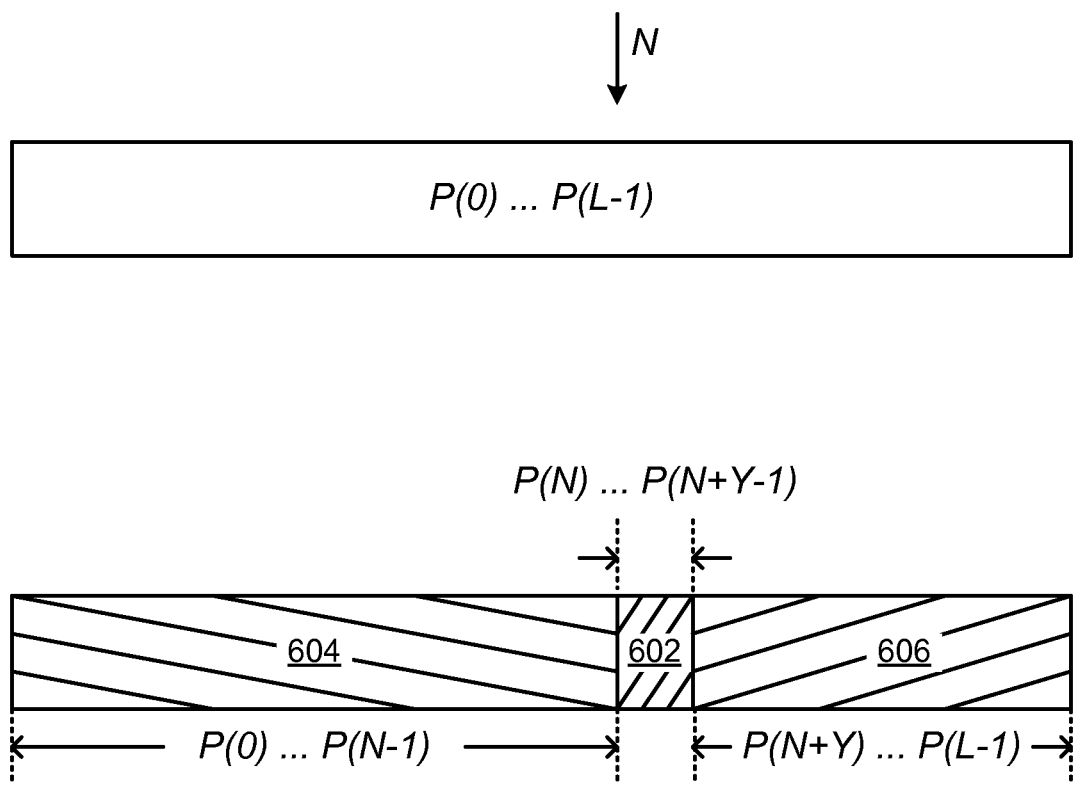
FIG. 6 illustrates an example password, an initial portion of the example password, and a remaining portion of the example password, according to an example embodiment.

FIG. 5 illustrates an example method for generating a password, and for determining an initial portion of the password and a remaining portion of the password. FIG. 6 illustrates an example password, an initial portion of the example password, and a remaining portion of the example password, helpful in understanding the example method of FIG. 5. Password server 330 may implement the example method illustrated in FIG. 5.

At 502, the password server may generate a password P of length L. As illustrated in FIG. 6, the elements of password P may be represented as $P(0), P(1), P(2), \ldots, P(L-1)$. For example, the password may be comprised of 512 bytes. At 504, the password server may generate a random position number N, where possible integer values of N range from 0 to $L-Y$, where Y is defined below. To continue the previous example, N may be the number 407. At 506, the password server may use Y elements of the password, starting from position N, as the initial portion of the password, which is sent by the password server to the mobile communication device. The length Y of the initial portion of the password may be fixed, or may vary from one password to another. As illustrated in FIG. 6, an initial portion 602 of the password may be represented as $P(N), P(N+1), P(N+2), \ldots, P(N+Y-1)$. To continue the previous example, Y may be the number 6. At 508, any remaining elements of password P before the initial portion are deemed a prefix, and any remaining elements of password P after the initial portion are deemed a suffix. Together, the prefix, if any, and the suffix, if any, comprise the remaining portion of the password, which is sent by the password server to the password client. As illustrated in FIG. 6, a prefix 604 may be represented as $P(0), P(1), \ldots, P(N-1)$, and a suffix 606 may be represented as $P(N+Y), P(N+Y+1), \ldots, P(L-1)$.

If the protocol for transferring the remaining portion of the password from the password server to the password client enables the password client to recognize the prefix as such and to recognize the suffix as such, then no further combination information is needed. To combine the input with the remaining portion of the password, the password client concatenates the prefix, the input and the suffix in that order.

In an alternative example method for determining an initial portion of the password and a remaining portion of the password, the initial portion may comprise password elements, some of which are non-sequential. If it is not already hard-coded or preprogrammed in the password client as to which password elements comprise the initial portion, then combining information indicating which password elements comprise the initial portion may be sent to the password client. For example, the initial portion of the password may comprise password elements $P(3), P(4), P(56), P(107)$, and $P(293)$, not necessarily in that order, and the combining information may comprise the values 3, 4, 56, 107, and 293. It may also be necessary to indicate to the password client the correspondence between elements of the input received at the network resource server and the elements of the initial password. For example, if the input received at the network resource server is represented as $i(0), i(1), i(2), i(3)$ and $i(4)$, it may be necessary to indicate to the password client that, for example, i(0) corresponds to P(3), i(1) corresponds to P(4), i(2) corresponds to P(107), i(3) corresponds to P(293), and i(4) corresponds to P(56).

Figures 1, 7:
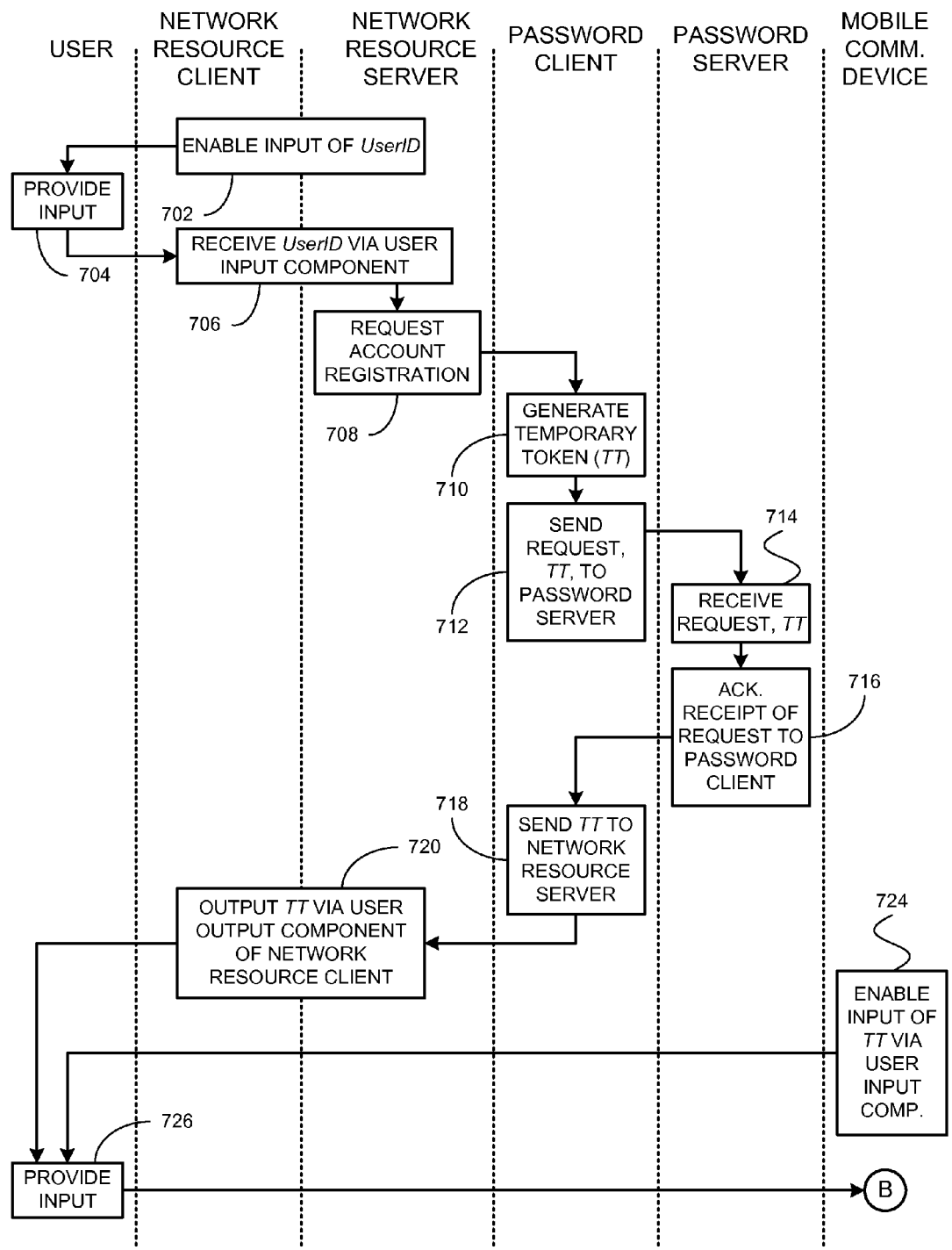
Figures 2, 7:
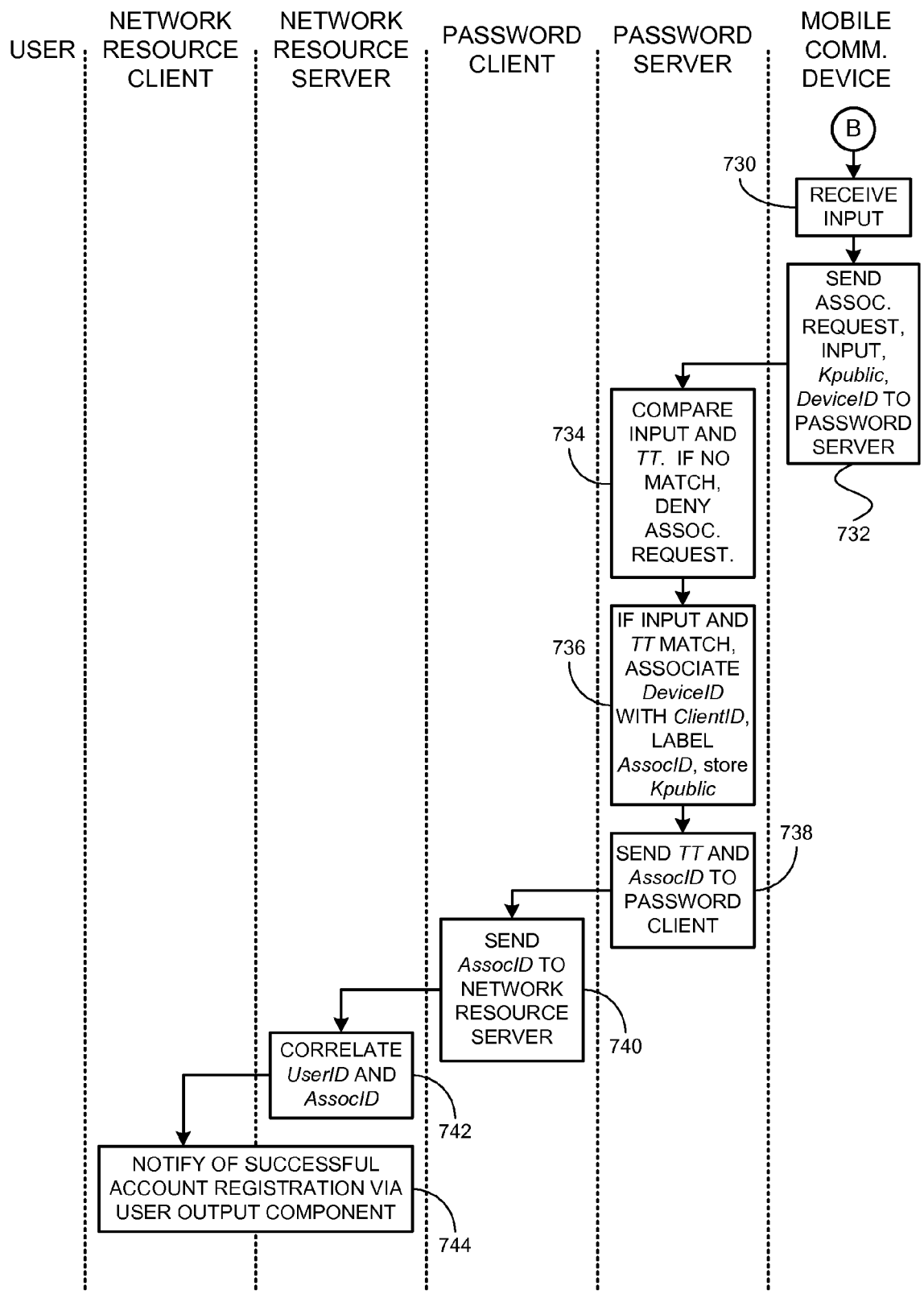

FIGS. 7-1 and 7-2 together illustrate an example method for registering a user account and mobile communication device to use the authentication scheme as described herein. For clarity of explanation, this example method involves network resource server 324, user account 326, and network resource client 318.

At 702, network resource server 324 enables input of UserID for account registration. At 704, the person wishing to register user account 326 provides input, which is received at 706 as UserID via a user input component of network resource client 318. For example, UserID may be entered as text in a text field of a graphical user interface, with the user input component being a touchscreen or a keyboard or a keypad or any other suitable user input component. In another example, UserID may be encoded in a card in the possession of the person and may be read by a card reader incorporated into or otherwise coupled to network resource client 318.

Since there are many different ways to divide the functionality of a network resource server and its network resource client, especially where user output and user input are concerned, such actions are indicated in FIGS. 7-1 and 7-2 as being the responsibility of both the network resource server and its network resource client. It will be obvious to persons of ordinary skill in the art how to adjust the method according to the actual division of functionality between the network resource server and its network resource client.

At 708, network resource server 324 requests account registration from password client 340. At 710, password client 340 randomly generates a temporary token, TT. In one implementation, the temporary token may be a combination of ClientID (in clear text or scrambled) and a random alphanumeric value. For example, ClientID=X100000 and TT=X100000A198CJ or TT=R!K3ERD3A198CJ. Other implementations for the temporary token are also contemplated. However, since the temporary token may need to be entered manually by the person in possession of mobile communication device 302, it is advisable that the temporary token not be so long as to make the manual entry cumbersome.

Temporary token TT serves as a session identifier for the account registration process. At 712, password client 340 sends an account registration request and TT to password server 330. At 714, password server 330 receives the account registration request and TT.

At 716, password server 330 sends an acknowledgement of receipt of the request to password client 340. This action may be taken by network operating center 336 instead of by password server 330, in response to network operating center 336 receiving the account registration request and TT from password client 340. At 718, in response to receiving the acknowledgement of receipt, password client 340 sends TT to network resource server 324. At 720, network resource server 324 outputs TT via a user output component of network resource client 318. In those examples where the network resource client has been described as a software application running on a computer, the intention here is that the user output component is a user output component of the computer, for example, a display or an audio output component.

Password server 330 passively waits for TT to be received from a mobile communication device. Password server 330 may set a time limit for TT to be received.

At 724, the person wishing to register account 326 initiates a registration application at mobile communication device 302 that enables input of TT via a user input component of mobile communication device 302.

At 726, after TT has been provided by network resource server 324 and mobile communication device 302 has enabled input of TT, the person wishing to register account 326 provides input, which is received at 730 as input, possibly via a user input component of mobile communication device 302. For example, the input may be entered as text or a series of numbers entered in a text field of a graphical user interface, with the user input component being a touchscreen or a keyboard or a keypad or any other suitable user input component.

At 732, the registration application initiated at 724 causes mobile communication device 302 to send an association request, along with input and the DeviceID of mobile communication device 302, to password server 330. Mobile communication device 302 may store a public-private key pair, (Kpublic, Kprivate), and may send the public key of the pair, Kpublic, to password server 330 at 732.

At 734, password server 330 compares input as received from mobile communication device 302 and TT as received from password client 340. If these two values do not match, then the association request is denied. Password server 330 may notify password client 340 that the association request is denied. Password server 330 may notify mobile communication device 302 that the association request is denied. If these two values match, then at 736, password server 330 creates an association of ClientID with DeviceID, and labels the association by association identifier AssocID. For example, password server 330 may maintain records of the form (AssocID, ClientID, DeviceID) in an association database 338. Password server 330 may also store Kpublic as part of the association. As explained above with respect to FIGS. 4-1, 4-2 and 4-3, when a network resource server requests authentication for access to a user account, the network resource server provides an AssocID correlated to a UserID. The AssocID is forwarded to the password server by a password client identified by ClientID. The password server then looks up the DeviceID associated with the ClientID in an association labeled with the AssocID, so that the password server determines to which mobile communication device to send the initial portion of the password. In this implementation, AssocID need not be unique, as long as (AssocID, ClientID) is unique. In an alternative implementation, if AssocID is unique, then there is no need for ClientID to be included in the records of association database 338. Rather, password server 330 may maintain records of the form (AssocID, DeviceID).

It should be noted that password server 330 may maintain different associations having the same DeviceID. This means that the same mobile communication device is associated with two or more user accounts. The user accounts may be at the same network resource server or at different network resource servers.

At 738, password server 330 sends TT and AssocID to password client 340. At 740, password client 340 sends AssocID to network resource server 324. At 742, network resource server 324 correlates UserID, as received from the person wishing to register user account 326, and AssocID. For example, network resource server 324 may maintain records of the form (UserID, AssocID) in a database 325. Likewise, network resource servers 304 and 314 may comprise databases 305 and 315, respectively, to store correlations of user identifiers and association identifiers. As explained above with respect to FIGS. 4-1, 4-2 and 4-3, when a network resource server receives a UserID in a request for access to a user account, the network resource server looks up the AssocID correlated to the UserID, and provides the AssocID to the password client so that the password server will be able to look up the DeviceID associated with the AssocID, and the password server will be able to determine to which mobile communication device to send the initial portion of the password. Furthermore, the network resource server may enable the person to change UserID without requiring a new registration process to be performed. If UserID is changed, the network resource server updates its internal records to correlate the updated value of UserID with the user account and updates the correlation of UserID and AssocID to reflect the updated value of UserID.

At 744, the network resource server 324 provides a notification of successful account registration via a user output component of network resource client 318. In those examples where the network resource client has been described as a software application running on a computer, the intention here is that the user output component is a user output component of the computer, for example, a display or an audio output component.

It will be appreciated by persons of ordinary skill in the art that the same UserID may be used to access multiple different user accounts, when the multiple user accounts are not hosted or accessible by the same network resource servers. For example, if the network resource server permits the person to choose the user identifier that is linked to the user account, then the person may choose the same user identifier for more than one user account. This will make it easier for the person to access the user accounts, since fewer user identifiers need to be remembered.

If the mobile communication device is replaced by the person who wishes to access the user account, then it will be helpful to have a process to update all associations at the password server involving the DeviceID of the old mobile communication device with the DeviceID of the new mobile communication device. That will enable the person to continue to use the authentication scheme to access user accounts that were registered with the old mobile communication device.

Figure 8:
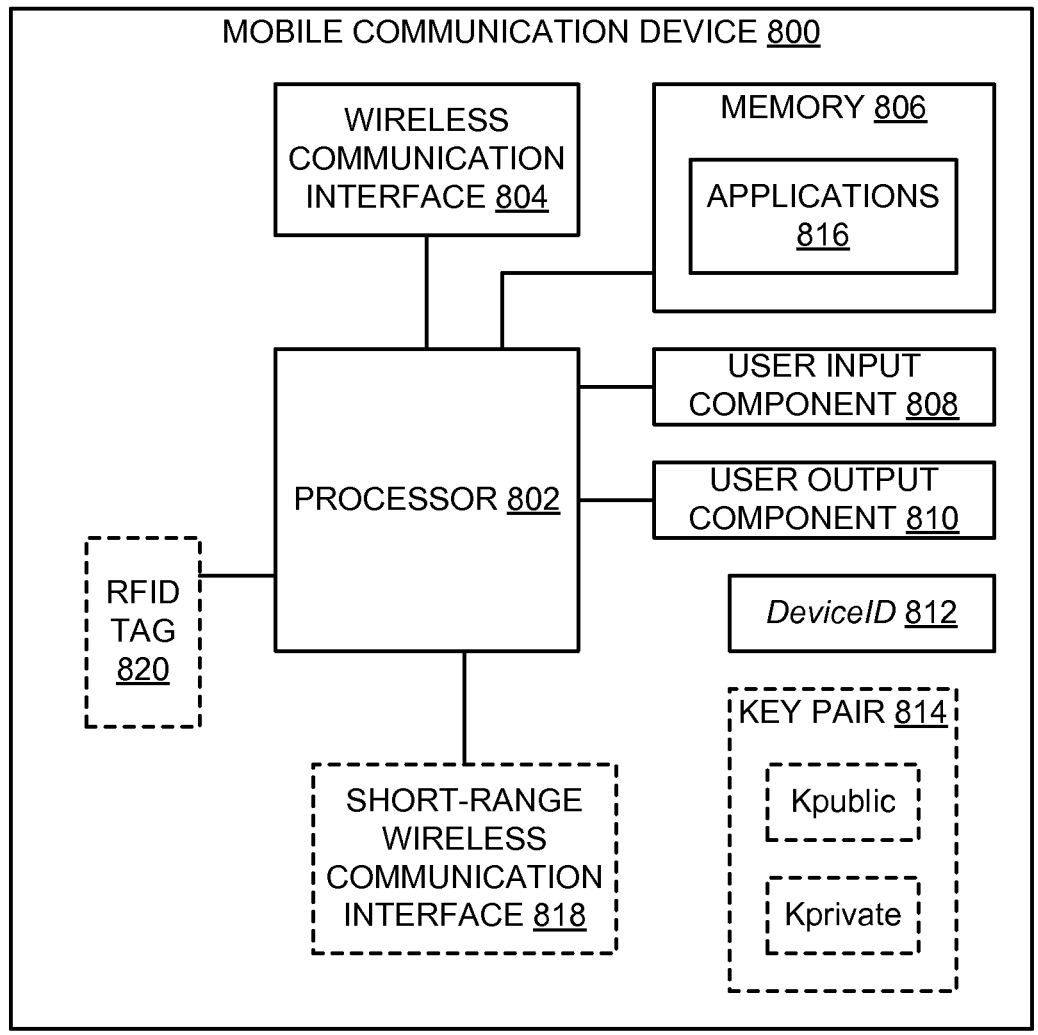
FIG. 8 is a block diagram of a mobile communication device, according to an example embodiment.

FIG. 8 is an example block diagram of a mobile communication device 800. Mobile communication device 800 comprises a processor 802. Mobile communication device 800 also comprises a wireless communication interface 804, a memory 806, at least one user input component 808, and at least one user output component 810, all coupled to processor 802. Mobile communication device 800 is uniquely identified by a device identifier, DeviceID 812. Mobile communication device 800 may optionally store cryptographic information, for example, a public-private key pair 814 consisting of a public key, Kpublic, and a private key, Kprivate.

Wireless communication interface 804 enables mobile communication device 800 to communicate over a wireless communication link with a base station. Mobile communication device 804 may comprise more than one wireless communication interface, but for clarity, only one such interface is shown in FIG. 8.

Memory 806 stores one or more applications 816, including, for example, applications that enable mobile communication device 800 to implement its part of the methods described above with respect to FIGS. 4-1, 4-2, 4-3 and FIGS. 7-1 and 7-2. Specifically, applications 816 include an application to accept input and to send the input along with an identifier of mobile communication device 800 and an association request to the password server. Applications 816 may optionally include a text-to-speech converter to convert the initial part of the password. Applications 816 may optionally include a bar code generator to encode the initial part of the password in a bar code to be displayed on a display of mobile communication device 800.

A non-exhaustive list of examples for user input component 808 includes a trackball, a wheel, a key, a keyboard, a keypad, a touchscreen, a button, and an audio input component. A non-exhaustive list of examples for user output component 810 includes a display, an audio output component, and a touchscreen.

Mobile communication device 800 may optionally comprise a short-range wireless communication interface 818 coupled to processor 802. Short-range wireless communication interface 818 may enable mobile communication device 800 to communicate a value, for example, the initial portion of the password, to a network resource server via a network resource client. Mobile communication device 800 may optionally comprise an RFID tag 820 coupled to processor 802, where processor 802 is able to program a value, for example, the initial portion of the password, to RFID tag 820.

Mobile communication device 800 may comprise other components that, for clarity, are not illustrated in FIG. 8.

Figure 9:
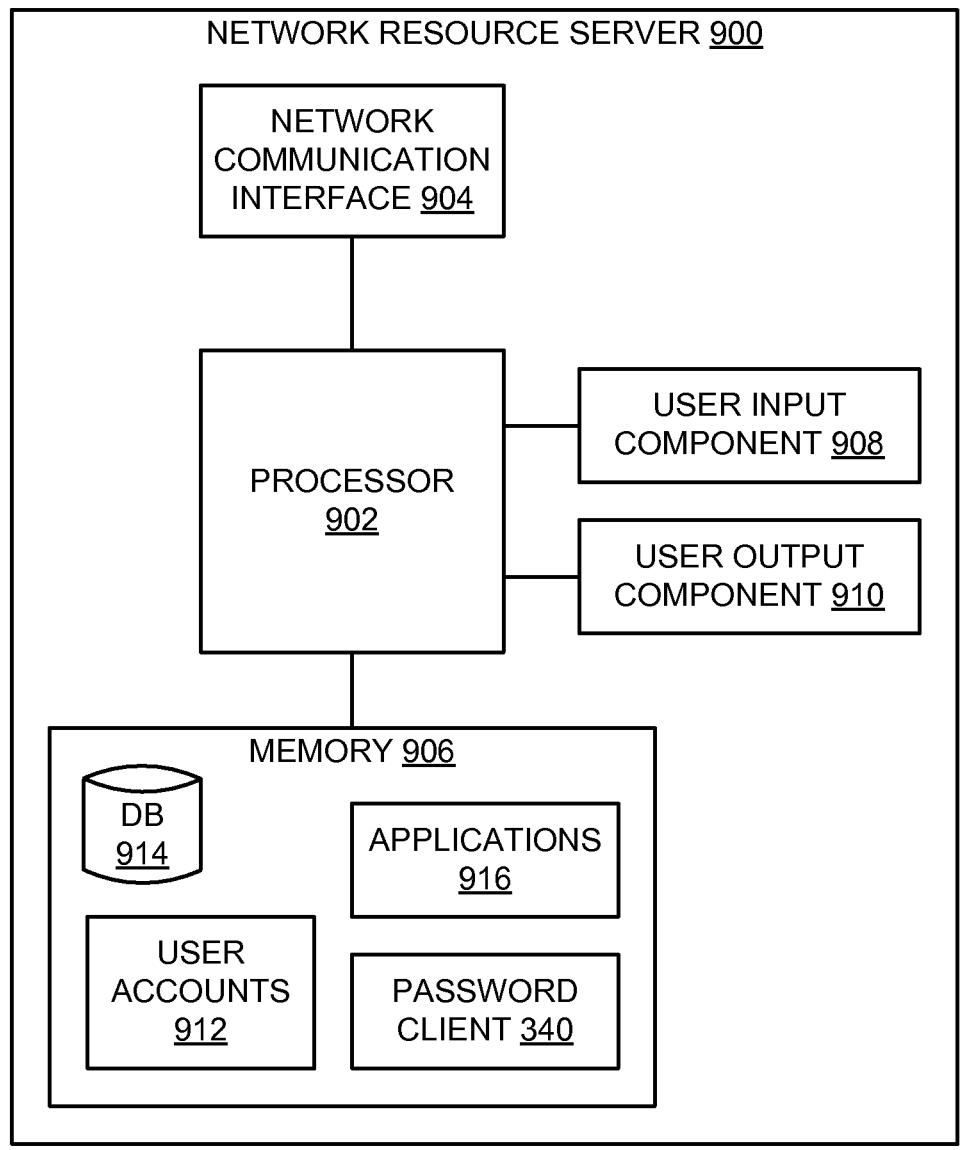
FIG. 9 is a block diagram of a network resource server, according to an example embodiment.

FIG. 9 is an example block diagram of a network resource server 900. Network resource server 900 comprises a processor 902. Network resource server 900 also comprises a network communication interface 904, a memory 906, an optional user input component 908, and an optional user output component 910, all coupled to processor 902. Network communication interface 904 enables network resource server 900 to communicate over a network with network resource clients and with password server 330 (possibly through network operating center 336).

Memory 906 stores user accounts 912 or at a minimum, information regarding user accounts 912, such as user identifiers. Memory 906 also comprises a database 914, to store correlations of user identifiers and association identifiers. Memory 906 stores one or more applications 916, including, for example, applications that enable network resource server 900 to implement its part of the methods described above with respect to FIGS. 4-1, 4-2, 4-3 and FIGS. 7-1 and 7-2. Memory 906 also stores password client 340.

Network resource server 900 may comprise other components that, for clarity, are not illustrated in FIG. 9.

Figure 10:
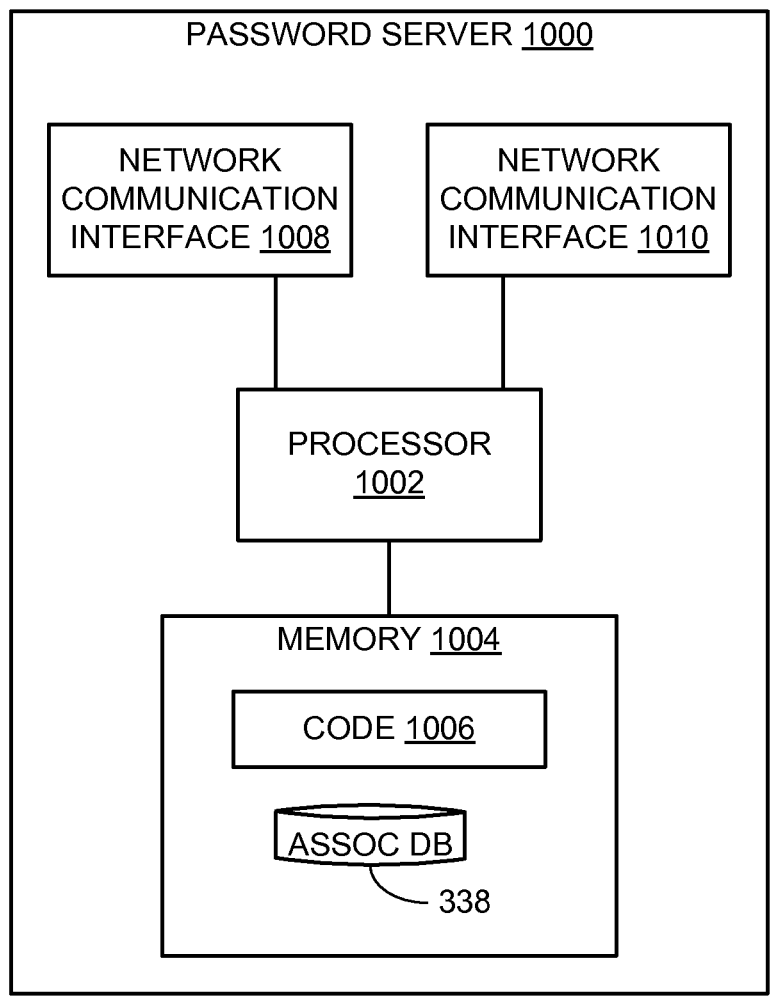
FIG. 10 is a block diagram of a password server, according to an example embodiment.

FIG. 10 is an example block diagram of a password server 900. Password server 1000 comprises a processor 1002 and a memory 1004 coupled to processor 1002. Memory 1004 stores association database 338 and code 1006, which enables password server 1000 to implement its part of the methods described above with respect to FIGS. 4-1, 4-2, 4-3 and FIGS. 7-1 and 7-2.

Password server 1000 optionally also comprises a network communication interface 1008, which enables password server 1000 to communicate over a network with password clients installed in or otherwise coupled to network resource servers. Password server 1000 optionally also comprises a network communication interface 1010, which enables password server 1000 to communicate over a network and base stations with mobile communication devices. Alternatively, network operating center may include one or both of these network communication interfaces and may facilitate communications between password server 1000, password clients and mobile communication devices.

Password server 1000 may comprise other components that, for clarity, are not illustrated in FIG. 10.

While certain features have been illustrated and described herein, many modifications, substitutions, changes, and equivalents will now occur to those of ordinary skill in the art. Example embodiments may be provided as a computer program product, or software, that may include a machine-readable medium having stored thereon instructions. Regarding the example embodiment methods illustrated in FIGS. 4-1, 4-2, 4-3, 5, 7-1 and 7-2, some of the steps illustrated may be performed in an order other than that which is described. Also, it should be appreciated that not all of the steps described in these flow diagrams are required to be performed, that additional steps may be added, and that some of the illustrated steps may be substituted with other steps. It is, therefore, to be understood that the appended claims are intended to cover all such modifications and changes.

What is claimed is:

1. A method for requesting access to a user account from a network resource server, the method comprising:
   providing an identifier of the user account to the network resource server;
   subsequently receiving an initial portion of a password but not a remaining portion of the password at a mobile communication device; and
   providing the initial portion of the password but not the remaining portion of the password to the network resource server.

2. The method according to claim 1, wherein receiving the initial portion of the password comprises viewing the initial portion of the password in a display of the mobile communication device, and providing the initial portion of the password comprises typing the initial portion of the password one character at a time at a user input component coupled to the network resource server.

3. The method according to claim 1, wherein receiving the initial portion of the password comprises viewing the initial portion of the password as a bar code in a display of the mobile communication device, and providing the initial portion of the password comprises presenting the display of the mobile communication device to a bar code reader coupled to the network resource server.

4. The method according to claim 1, wherein the initial portion of the password, once received at the mobile communication device, is programmed to a radio frequency identification (RFID) tag coupled to the mobile communication device, and providing the initial portion of the password comprises bringing the RFID tag within communication distance of an RFID reader coupled to the network resource server.

5. The method according to claim 1, wherein providing the initial portion of the password comprises communicating the initial portion of the password from the mobile communication device via a short-range wireless communication link to a network resource client coupled via a network to the network resource server.

6. A non-transitory computer-readable medium having stored thereon instructions for a processor which when executed by a password server, results in:
   generating a password;
   determining an initial portion of the password and a remaining portion of the password;
   calculating a value that is a function of the password;
   sending the initial portion to a mobile communication device for output thereby;
   sending the remaining portion to a password client;
   receiving a value from the password client;
   comparing the value received from the password client and the value calculated at the password server;
   if the value received from the password client matches the value calculated by the password server, determining that the password client has successfully received the initial portion as output by the mobile communication device and the remaining portion from the password server, and therefore determining that authentication has succeeded; and
   if the value received from the password client does not match the value calculated by the password server, determining that authentication has failed.

7. The non-transitory computer-readable medium according to claim 6, wherein the instructions when executed by the password server, result in:
   receiving a request for authentication from the password client, wherein the request comprises an identifier of the password client and an association label; and
   looking up a device identifier associated at the password server with the identifier received from the password client in an association labeled with the association label,
   wherein the mobile communication device to which the initial portion is sent is the mobile communication device identified by the device identifier.

8. The non-transitory computer-readable medium according to claim 7, wherein the association label received from the password client is correlated with a user account, and wherein the authentication is performed in order to determine whether to permit access to the user account.

9. The non-transitory computer-readable medium according to claim 6, wherein determining the initial portion and the remaining portion comprises:
   generating a random position in the password;
   using a consecutive sequence of elements of the password, starting from the random position, as the initial portion;
   deeming any remaining elements of the password before the initial portion as a prefix; and
   deeming any remaining elements of the password after the initial portion as a suffix,
   wherein the prefix, if any, and the suffix, if any, together comprise the remaining portion.

10. The non-transitory computer-readable medium according to claim 6, wherein the instructions when executed by the password server, result in:
    sending combining information to the password client regarding how to combine the remaining portion and the initial portion.

11. The non-transitory computer-readable medium according to claim 6, wherein the instructions when executed by the password server, result in:
    sending value calculation information to the password client regarding how the password client is to calculate the value from a combination of the initial portion and the remaining portion.

12. A non-transitory computer-readable medium having stored thereon instructions for a processor which when executed by a network resource server, results in:
    receiving from the network resource server a request for authentication along with an identifier of an association between a mobile communication device and a user account at the network resource server;
    requesting authentication from a password server by sending the identifier of the association to the password server;
    receiving from the password server a remaining portion of a password generated by the password server;
    instructing the network resource server to enable input of an initial portion of the password;
    receiving input from the network resource server;
    combining the input with the remaining portion to produce a combination;
    calculating a value that is a function of the combination;
    sending the value to the password server;
    receiving from the password server an indication whether authentication has succeeded or failed;

if authentication has succeeded, instructing the network resource server to permit access to the user account; and if authentication has failed, instructing the network resource server to restrict or deny access to the user account.

13. The non-transitory computer-readable medium according to claim 12, wherein the instructions when executed by the network resource server, result in:

receiving combining information from the password server, wherein combining the input with the remaining portion comprises combining the input with the remaining portion according to the combining information.

14. The non-transitory computer-readable medium according to claim 12, wherein the instructions when executed by the network resource server, result in:

receiving value calculation information from the password server, wherein calculating the value comprises calculating the value according to the value calculation information.

* * * * *